(12) United States Patent
Zomet

(10) Patent No.: US 8,531,518 B1
(45) Date of Patent: Sep. 10, 2013

(54) SYSTEM AND METHOD FOR CAPTURING VIDEOS WITH A MOBILE DEVICE

(75) Inventor: Asaf Zomet, Jerusalem (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/597,081

(22) Filed: Aug. 28, 2012

(51) Int. Cl.
*H04N 7/18* (2006.01)

(52) U.S. Cl.
USPC .......................................................... 348/135

(58) Field of Classification Search
None
See application file for complete search history.

(56) References Cited

U.S. PATENT DOCUMENTS

| | | | | |
|---|---|---|---|---|
| 3,419,674 | A * | 12/1968 | Burns et al. | 348/14.05 |
| 6,452,628 | B2 * | 9/2002 | Kato et al. | 348/333.12 |
| 6,970,580 | B2 * | 11/2005 | Kies | 382/118 |
| 7,483,057 | B2 * | 1/2009 | Grosvenor et al. | 348/211.9 |
| 8,189,053 | B2 * | 5/2012 | Pryor | 348/207.11 |
| 2002/0140912 | A1 * | 10/2002 | Cotton et al. | 353/122 |
| 2009/0219303 | A1 * | 9/2009 | Thelen et al. | 345/672 |

\* cited by examiner

*Primary Examiner* — Nhon Diep
(74) *Attorney, Agent, or Firm* — Troutman Sanders, LLP; James E. Schutz; Mark L. Jones (57) ABSTRACT

A system and method for capturing videos with a mobile device is provided. The method may include identifying, at a computing device, an intended target of a video recording, wherein the intended target is substantially centered within a display of the computing device. The method may include determining, in response to the intended target being out of position, that the intended target is not substantially centered within the display and outputting a non-visual indication that the intended target is not currently substantially centered within the display.

20 Claims, 6 Drawing Sheets

SYSTEM AND METHOD FOR CAPTURING VIDEOS WITH A MOBILE DEVICE

BACKGROUND

Many mobile devices (e.g., smartphones) include a camera that provides video-recording and photography functionality. In most instances, a user can compose a recorded video by pointing the mobile device camera at a subject, initializing the recording functionality, and framing the subject within a viewfinder displayed at a screen of the mobile device. Unfortunately, in many circumstances, the user's current position and the desired recording angle may be such that the user is unable to view the screen of the mobile device while recording. For example, when holding the mobile device in a high position (e.g., over the user's head), a user may not be able to see the viewfinder and thus may be unable to position the mobile device to maintain the target of the video in the center of the recorded video frame. One existing approach is to include an adjustable screen that is tilted to provide visibility even at odd angles, but this solution may be less appropriate for many mobile devices (such as small pocket cameras and mobile phones).

SUMMARY OF DISCLOSURE

In one implementation, a computer-implemented method, in accordance with this disclosure may include identifying, at a computing device, an intended target of a video recording, wherein the intended target may be substantially centered within a display of the computing device. The method may include determining, at the computing device, in response to the intended target being out of position, that the intended target may not be substantially centered within the display. The method may further include outputting, by the computing device, a non-visual indication that the intended target may not be currently substantially centered within the display.

One or more of the following features may be included. The method may include outputting, by the computing device, a non-visual indication that the intended target is centered within the display. In some implementations, the non-visual indication is at least one of an audible indication and a vibration. In some implementations, an intensity of the non-visual indication may be based at least in part on a magnitude of deviation of the intended target from a center of the display. In some implementations, the non-visual indication may comprise speech. In some implementations, the speech may indicate a proposed corrective direction for the computing device to be moved in order to substantially center the intended target within the display. In some implementations, determining the intended target may include activating a fixation mode associated with the computing device.

In another implementation, a non-transitory processor-readable storage medium having a plurality of instructions stored thereon is provided. In some implementations, the instructions, which when executed by a processor, cause the processor to perform one or more operations. Some operations may include receiving, at a mobile device, a user input. Operations may further include, in response to the user input, identifying, at the mobile device, an intended target of a video recording, wherein the intended target is substantially centered within a display of the mobile device. Some operations may include determining, at the mobile device, in response to the intended target being out of position, that the intended target is not substantially centered within the display. Operations may further include outputting a non-visual indication that the intended target is not currently substantially centered within the display.

One or more of the following features may be included. Operations may further include outputting a non-visual indication that the target is currently substantially centered within the display. The non-visual indication is at least one of an audible indication and a vibration. In some implementations, an intensity of the non-visual indication may be based at least in part on a magnitude of deviation of the intended target from a center of the display. The non-visual indication may comprise speech. In still further implementations the speech may indicate a proposed corrective direction for the mobile device to be moved in order to substantially center the intended target within the display. In some implementations, determining the intended target may include activating a fixation mode associated with the mobile device.

In another implementation, a computing system is provided. In some implementations, the computing system may include one or more processors associated with a mobile device, a camera associated with the mobile device, and a computer-readable storage medium storing instructions that, when executed by the one or more processors, cause the one or more processors to perform one or more operations. Operations may include identifying an intended target, wherein the intended target is substantially centered within a display associated with the camera. Operations may further include determining that the intended target is not currently centered within the display based at least in part on a predetermined positional threshold. Operations may further include outputting a non-visual indication that the intended target has exceeded the predetermined positional threshold associated with the display.

One or more of the following features may be included. The one or more processors may be further configured to calculate a distance between an original position associated with the intended target and a new position associated with the intended target. The one or more processors may be further configured to compare the distance to the predetermined positional threshold. In some implementations, an intensity of the non-visual indication may be based at least in part on a magnitude of deviation of the intended target from a center of the display. In some implementations, the non-visual indication may be at least one of an audible indication and a vibration. In some implementations, the non-visual indication may comprise speech.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE IMPLEMENTATIONS

Implementations disclosed herein concern a novel methodology for capturing videos with a portable computing device (e.g., a camera, a cellular phone with a camera, a smartphone, or any device capable of taking pictures or videos). Although the implementations disclosed herein concern capturing videos, the implementations described herein are not meant to be limited to capturing videos and may also be used in capturing still images, such as photographs. In some cases, e.g., when filming a video, the user of a smartphone may not be able to see the screen associated with his/her device, particularly if the user needs to hold the device at an odd position (e.g., high above his/her head).

Implementations described herein may provide the user with an option to set his/her device to a "fixation" mode, which may be set with the subject of interest in the center of a display of the device. Subsequently, the user may move the device to a position that does not allow the user to see the display of the smartphone directly (e.g. above his/her head).

Implementations described herein may provide an indication to the user indicative of whether or not the subject of interest is currently within the center of the display of the device. The indication may take any number of forms, including, but not limited to, vibrations, audible sounds, verbal commands, etc. In some implementations, the intensity of the indication may vary based upon an amount of deviation from the center of the display.

As discussed above and referring also to FIGS. 1-4, video capture process may determine 402, at a computing device 106, an intended target of a video recording, wherein the intended target is substantially centered within a display of the computing device. Video capture process may then determine 404, at the computing device, in response to the intended target being out of position, that the intended target may not be substantially centered within the display. Video capture process may also output 406, by the computing device, a non-visual indication that the intended target is not currently substantially centered within the display.

Figure 1:
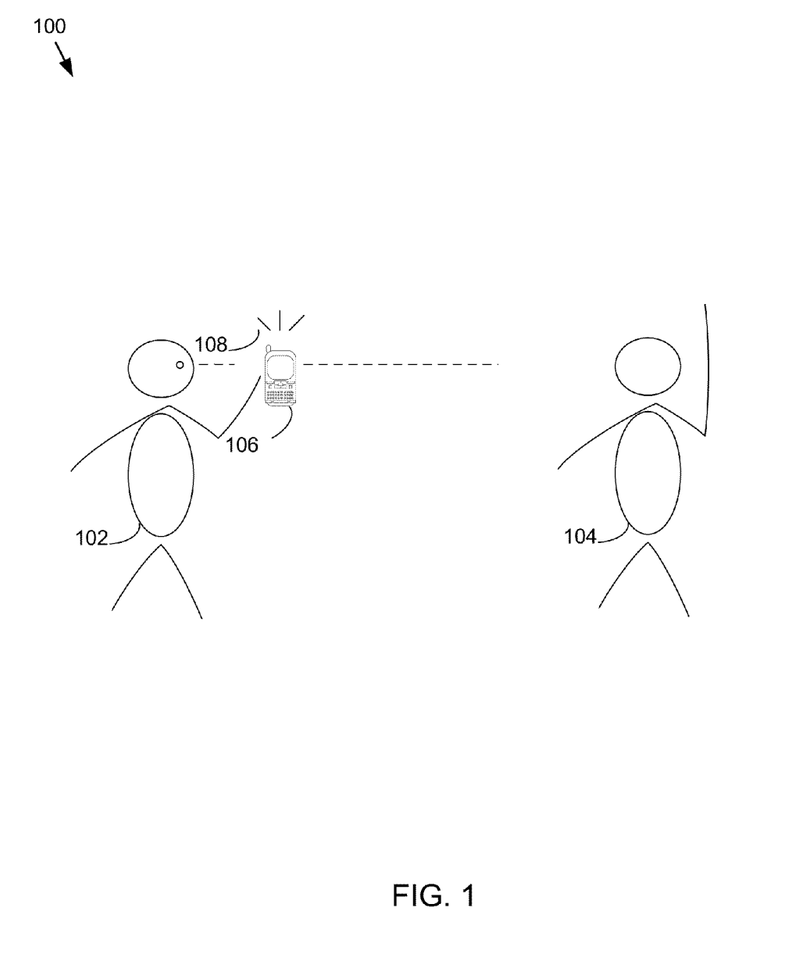
FIG. 1 is a diagrammatic view of a method for capturing video in accordance with an implementation of the present disclosure.

Referring now to FIG. 1, a diagram 100 depicting one implementation in accordance with video capture process is provided. In operation, a user (e.g. user 102) may set the shooting mode of computing device 106 (e.g., a smartphone) to a fixation mode in order to capture an intended target or subject of interest (in this particular example, user 104) in the center of the image. For example, in FIG. 1, user 102 may adjust computing device 106 so that user 104 is positioned appropriately within a display on computing device 106. The user may then activate the fixation mode associated with computing device 106 in order to capture the target.

Figure 2:
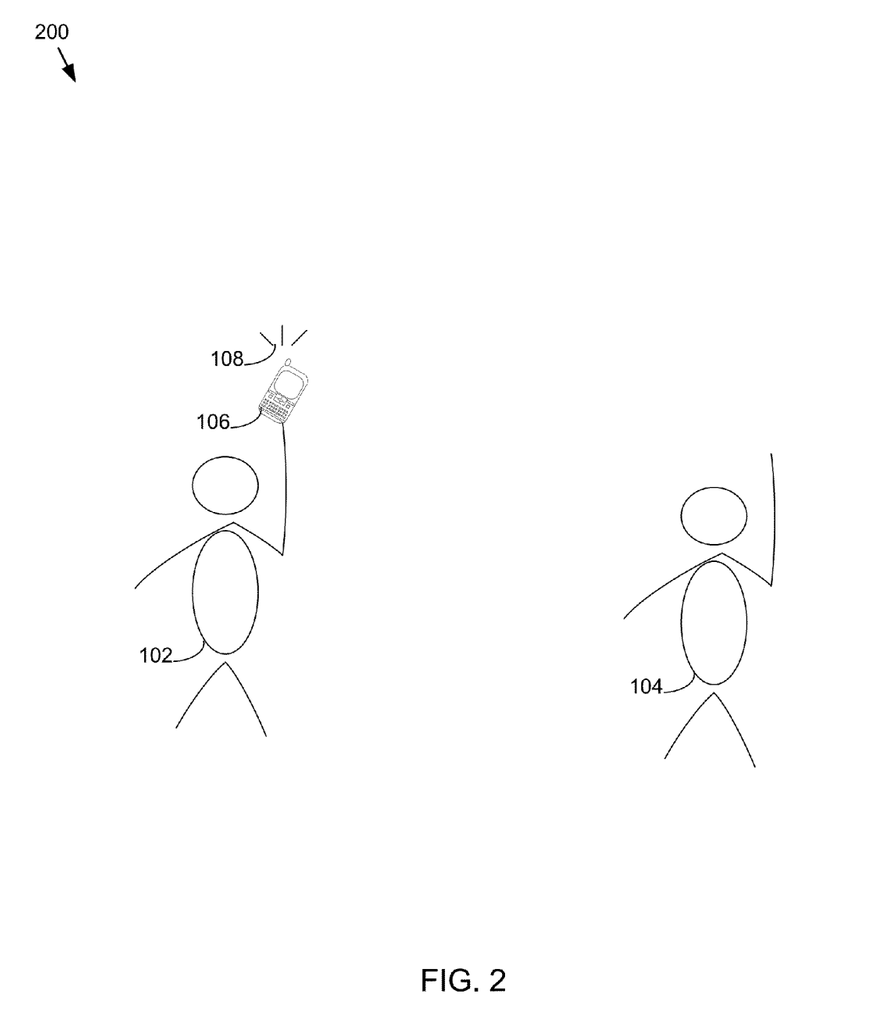
FIG. 2 is a diagrammatic view of a method for capturing video in accordance with an implementation of the present disclosure.
Figure 3:
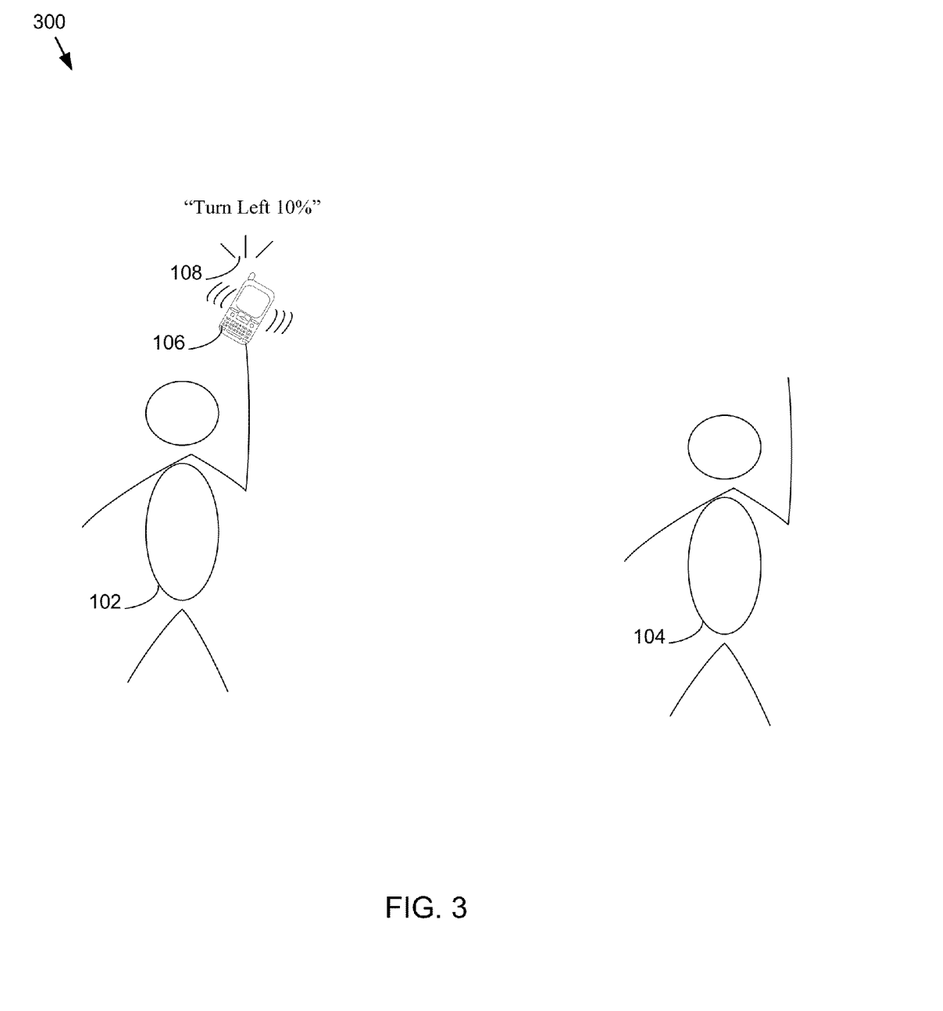
FIG. 3 is a diagrammatic view of a method for capturing video in accordance with an implementation of the present disclosure.
Figure 4:
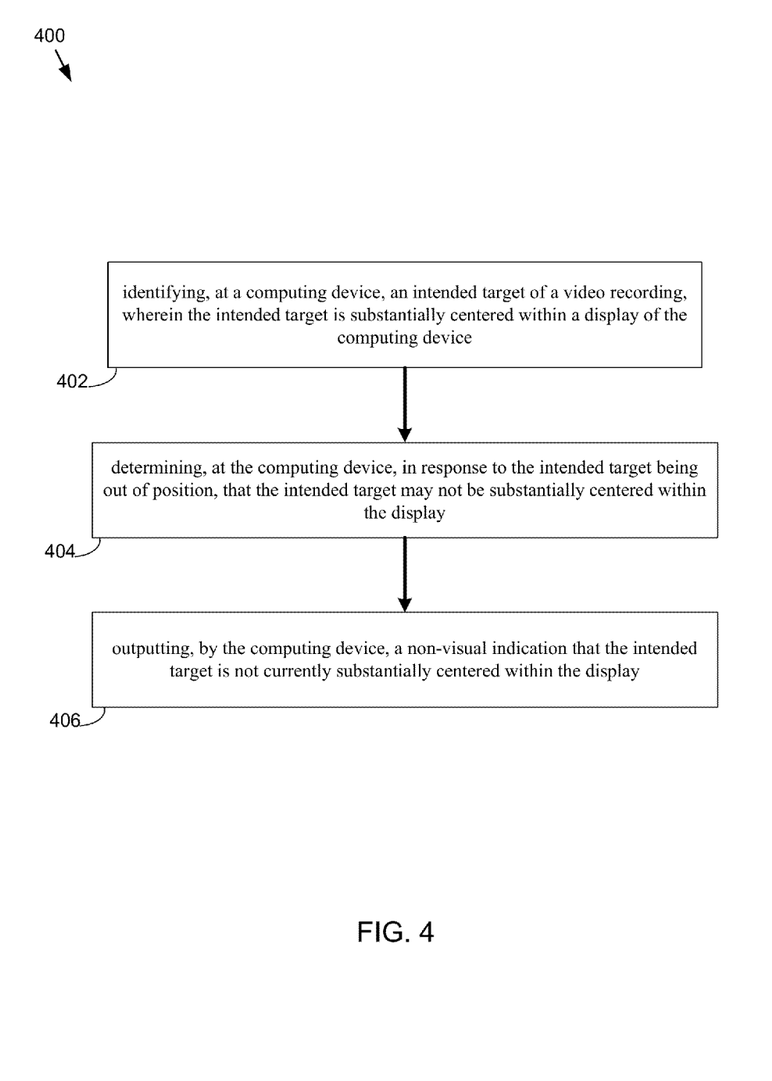
FIG. 4 is a flowchart of a method for capturing video in accordance with an implementation of the present disclosure.

Once the target has been captured, user 102 may then alter the position of computing device 106 with reference to the intended target. For example, and as shown in FIG. 2, user 102 may raise computing device 106 to a new position, in this case above their head. If, at this new position, the intended target or subject of interest is not in the center of the display, computing device 106 may output a non-visual indication 108 that the intended target of the video recording is not substantially centered appropriately within the display of computing device 106.

Figure 5:
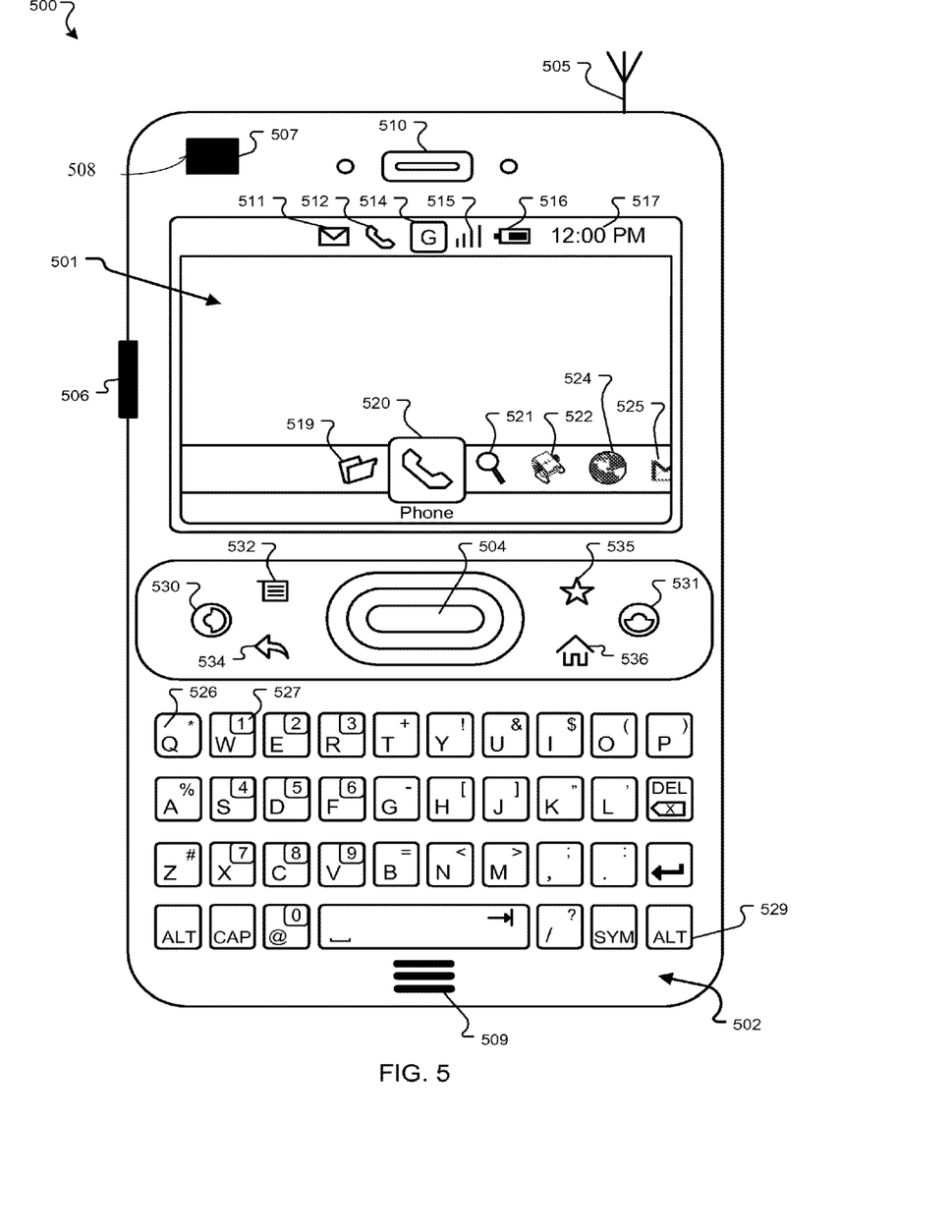
FIG. 5 is a schematic representation of an example mobile device that implements aspects of video capture techniques described herein.

As discussed above, in some implementations, video capture process may be configured to determine 402 an intended target of a video recording. In some implementations user 102 may assign the intended target 104 as whatever person or object is in the center of the display of the computing device when entering fixation mode. The computing device may include a display that depicts the intended target, which may be substantially centered within the display. Determining and/or capturing the target may be achieved using any number of suitable methods. For example, user 102 may be provided with an option at computing device 106 (e.g., a capture button) that may allow for the user to identify and/or select the intended target or a portion of the intended target for tracking. In this way, user 102 may align computing device 106 with their intended target, in this case user 104. Computing device 106 may be configured to receive an input from user 102 identifying the intended target for capture (e.g. in order to set the fixation mode). In some implementations, computing device 106 may include a touchscreen (e.g., associated with a display, e.g., display 501) that may allow the user to select the intended target for capture by touching a portion of the touchscreen.

As discussed above, in some implementations, video capture process may also determine 404, in response to the computing device having moved relative to the intended target, that the intended target is not substantially centered within the display of the computing device. Accordingly, video capture process may utilize various image processing techniques such as those known in the art. For example, video capture process may utilize object recognition techniques during one or more of the determining/capturing 402 and determining 404 operations. Some object recognition techniques may include but are not limited to, recognition by parts, appearance based methods, feature based methods, etc. In some implementations, image processing techniques may be used for object recognition. In some implementations, image processing techniques may be used to assign identifiers to an image element. In some implementations, image processing techniques may be used to determine and/or identify the centroid of the identified object or image element.

In some implementations, video capture process may also determine 404, in response to the intended target being out of position, that the intended target may not be substantially centered within the display. Accordingly, video capture process may utilize various image processing techniques such as those known in the art.

Additionally and/or alternatively, video capture process may also utilize one or more video tracking techniques and/or algorithms such as those known in the art. Some video tracking techniques may include but are not limited to, target representation and localization as well as filtering and data association. Some common target representation and localization algorithms may include blob tracking, kernel-based tracking, contour tracking (e.g. those using active contours or condensation algorithms), and visual feature matching. Some common filtering algorithms may include Kalman filters and particle filters.

In one example, user 102 may use computing device 106 to video user 104. User 102 may enter a fixation mode of their computing device 106 and user 102 may identify user 104 as the intended target of the video capture and may indicate the position on the display of the computing device 106 user 102 would like to capture intended target 104. Video capture process may receive the identification of the intended target 104 and use video tracking techniques and/or algorithms to determine the position the intended target 104 within the display of the computing device 106. Video capture process may output indicators to user 102 when the intended target 104 deviates from the indicated position of the display of the computing device 106, video capture process may output indicators 108 to help guide user 102 to capturing video with the intended target 104 at the indicated position in the display.

In some implementations, video capture process may also output 406 a non-visual indication that the intended target is not currently substantially centered within a display (e.g. display 501) associated with the video recording. Non-visual indication 108 may persist until user 102 moves computing device 106 such that the intended target or subject of interest is again at, or near, the center of the image. The center of the image may be defined, for example, as the intended subject or target being in the middle 30% of the image. In this way, a predetermined positional threshold may be utilized by video capture process. This predetermined positional threshold may be set automatically and/or may be set manually by the user through computing device 106. As such, process may output a non-visual indication that the intended target has exceeded the predetermined positional threshold associated with the display. This particular rule (e.g., 30%) is merely provided as an example, as any number of settings and ranges could be defined without departing from the scope of the present disclosure. It should be noted that, in some implementations, although the image may not be shown on the display (e.g. display 501) of the computing device 106, but the predetermined positional threshold analysis may be performed with reference to the display. For example, video capture process may track the targeted object until it is no longer visible on the screen but may estimate the position of the targeted object with reference to the display. In an alternative implementation, the predetermined positional threshold analysis may be performed with reference to display associated with the computing device. In some implementations, the threshold analysis may be determined with respect to the center of the camera field of view. From a user perspective, this may appear to be the center of the display associated with a computing device or camera.

In some implementations, video capture process may be configured to calculate a distance between an original position and/or angle associated with the intended target and a new position associated with the intended target. Any suitable point of reference may be used in this calculation. Video capture process may also compare the calculated distance and/or angle to the predetermined positional threshold as discussed above.

In some implementations, the indication intensity associated with non-visual indication 108 may be proportional to the deviation of the target from the center, so as to provide more informative feedback to the user. In some implementations, the non-visual indication may also include outputting feedback regarding the direction of deviation. In some implementations, the non-visual indication may be audio indicators. In some implementations, the non-visual indication may be vibrations of the computing device.

In some implementations, non-visual indication 108 may be relayed in any suitable manner, including but not limited to, audible indications, vibrations, verbal indications, etc. For example, some audible indications may include generating one or more commands. In some implementations, these commands may be produced in an earphone or headphone of the user, so that the sound is not heard in the video recording.

In this particular example, with a sound indication, computing device 106 may generate one or more commands, in order to provide a proposed corrective direction. For example, a command of "left 10%", "up slightly", etc., which may direct user 102 how to adjust the position of computing device 106 may be provided. Additionally and/or alternatively, non-visual indication 108 may include a sensory indication, such as the vibration shown in FIG. 3. In some implementations, the strength of the vibration may be indicative of the amount of deviation that the target has drifted from the center of the image. In this way, a level of non-visual indication 108 may be based upon, at least in part, an amount of deviation from a centered location. Additionally and/or alternatively, video capture process may be configured to determine that the target is currently centered within a display or display operatively coupled to the computing device, wherein the display is configured to output a visual indication of content recorded by the computing device.

In some implementations, the intended target may be either a static target or a dynamic target. In this way, fixation or capture mode described above may not assume a fixed capture orientation, but rather a "focusing" on a target or subject that may be moving during capture.

In some implementations, a method in accordance with video capture process may include receiving, at a smartphone, a user input. In response to the user input, video capture process may determine, at the smartphone, an intended target of a video recording. Video capture process may also determine that a position of the smartphone has been altered with reference to the intended target. Video capture process may also output a non-visual indication that the target is not centered within a display associated with the smartphone. The term "smartphone" as used herein, may refer to a mobile phone that includes advanced functionality beyond making phone calls and sending text messages such as that shown and described in FIG. 5 below. The term "display" as used herein, may refer to a window associated with a computing device configured to allow for the viewing of content, such as the targets described above.

Referring now to FIG. 5, the exterior appearance of an example device 500 that implements a video capturing method is illustrated. Briefly, and among other things, the device 500 includes a processor configured to capture a target of a video recording, determine that a position of the computing device has been altered with reference to the target and provide a non-visual indication that the target is not centered within a display and/or display associated with the computing device.

In more detail, the hardware environment of the device 500 may include a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera/videocamera 507; a display 508; a microphone 509; and a speaker 510. Although the device 500 shows an external antenna, the device 500 may include an internal antenna, which may not be visible to the user. Additionally and/or alternatively, it should be noted that display 508 may be located anywhere on computing device 500.

In some implementations, display 501 may be configured to display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

Display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

In operation, a user may use the keyboard (or "keypad") 502 to enter commands and data to operate and control the operating system and applications. The keyboard 502 may include standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, keyboard 502 may also include other special function keys, such as an establish call key 530 that causes a received call to be answered or a new call to be originated; a terminate call key 531 that causes the termination of an active call; a drop down menu key 532 that causes a menu to appear within the display 501; a backwards navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control. As discussed above, additionally and/or alternatively, device 500 may include a touchscreen, which may replace some or all of the features shown in FIG. 5. For example, keyboard 502 may be removed in a touchscreen configuration.

In some implementations, the user may use pointing device 504 to select and adjust graphics and text objects displayed on the display 501 as part of the interaction with and control of the device 500 and the applications invoked on the device 500. The pointing device 504 may be any appropriate type of pointing device, and may be a joystick, a trackball, a touchpad, a camera, a voice input device, a touch screen device implemented in combination with the display 501, or any other input device.

Antenna 505, which may be an external antenna or an internal antenna, may be a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur.

The wireless or wireline computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wireline or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, an IEEE-1394 FIREWIRE connector, a Universal Serial Bus (USB) connector (including a mini-B USB interface connector), a serial port connector, a parallel port connector, or other wireline connector. In another implementation, the functions of the network connection 506 and the antenna 505 are integrated into a single component.

In some implementations, camera 507 may allow device 500 to capture digital images, and may be a scanner, a digital still camera, a digital video camera, or other digital input device. In one example implementation, the camera 507 may be a 5 mega-pixel (MP) camera that utilizes a complementary metal-oxide semiconductor (CMOS).

Microphone 509 may allow the device 500 to capture sound, and may be an omni-directional microphone, a unidirectional microphone, a bi-directional microphone, a shotgun microphone, or other type apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
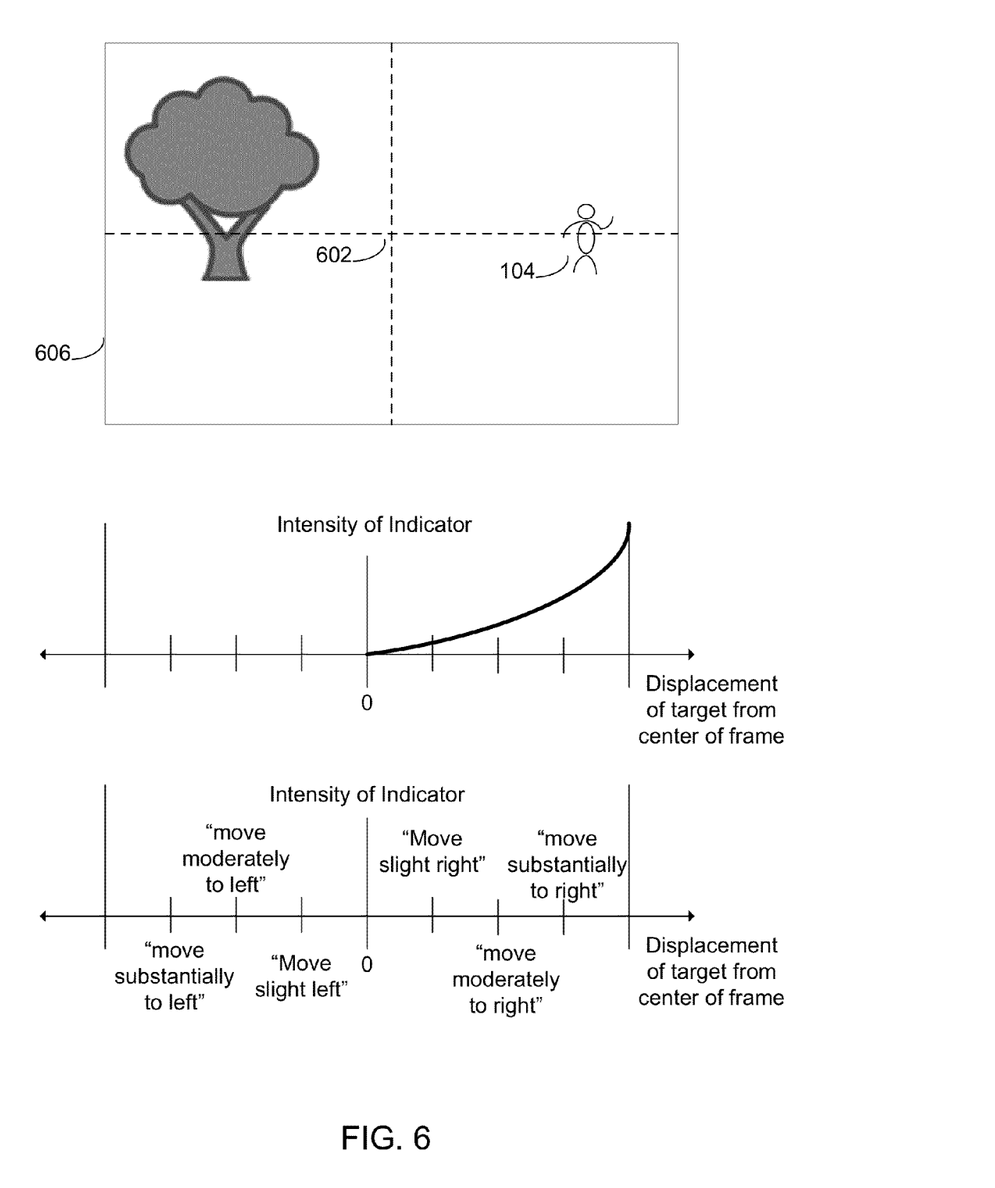
FIG. 6 is a diagrammatic view of an example of capturing video in accordance with an implementation of the present disclosure.

Referring now to FIG. 6, a diagrammatic view of an example of capturing video in accordance with an implementation of the present disclosure is depicted. In some implementations, video capture process may determine or identify that the intended target 104 is not substantially centered in the display 606 of the computing 106 device. The center 602 of the display may be indicated on the display through guidelines, crosshairs, or visual indication. Video capture process may adjust the intensity of the indicator 108 based on the distance from the center 602 of the display and the intended target 104. The graphs depicted in FIG. 6 may be one implementation of the indicator outputted to the user 102 by video capture process. For example, if intended target 104 is to the far right of the display and substantially distanced from the center 602 of the display, video capture process may output an audio indicator directing user 102 to "move substantially to the right." If the intended target is only slightly to the right from center 602 of the display 606, video capture process may output an audio indicator directing user 102 to "move slight right." Although the example described is directed to distance of the intended target from the center 602 of the display 606, video capture process may also determine, calculate, or otherwise identify an angle the mobile or computing device should be moved in order to capture the intended target 104 in substantially the center of the display 606.

In some implementations, user 102 may indicate where in the display 606 of the computing device 104 they would like the intended target 104 to be. In some implementations, user 102 may indicate a position other than the center 602 of the display 606 as the position they would like to capture intended target 104.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   identifying, by a computing device, an intended target of a video recording, wherein the intended target is substantially centered within a display associated with the computing device;
   determining, by the computing device, that the intended target is not substantially centered within the display, the determining being performed responsive to one or more of a first change in orientation of the computing device and a detected change in location of the intended target; and
   outputting, by the computing device, a non-visual indication that the intended target is not currently substantially centered within the display, wherein the non-visual indication indicates, at least in part, that a second change in orientation of the computing device is necessary to substantially center the intended target within the display.

2. The computer-implemented method of claim 1, further comprising:
   outputting, by the computing device, a non-visual indication that the intended target is centered within the display.

3. The computer-implemented method of claim 1, wherein the non-visual indication is at least one of an audible indication and a vibration.

4. The computer-implemented method of claim 1, wherein an intensity of the non-visual indication is based at least in part on a magnitude of deviation of the intended target from a center of the display.

5. The computer-implemented method of claim 3, wherein the non-visual indication comprises speech.

6. The computer-implemented method of claim 5, wherein the speech indicates a proposed corrective direction for the computing device to be moved in order to substantially center the intended target within the display.

7. The computer-implemented method of claim 1, wherein determining the intended target includes activating a fixation mode associated with the computing device.

8. A non-transitory processor-readable storage medium having stored thereon instructions that, when executed by a processor, cause the processor to perform operations comprising:
   receiving, at a mobile device, a user input;
   in response to the user input, identifying, by the mobile device, an intended target of a video recording, wherein the intended target is substantially centered within a display associated with the mobile device;
   determining, by the mobile device, that the intended target is not substantially centered within the display, the determining being performed responsive to one or more of a first change in orientation of the computing device and a detected change in location of the intended target; and
   outputting a non-visual indication that the intended target is not currently substantially centered within the display, wherein the non-visual indication indicates, at least in part, that a second change in orientation of the computing device is necessary to substantially center the intended target within the display.

9. The non-transitory processor-readable storage medium of claim 8, wherein the operations further comprise:
   outputting a non-visual indication that the target is currently substantially centered within the display.

10. The non-transitory processor-readable storage medium of claim 8, wherein the non-visual indication is at least one of an audible indication and a vibration.

11. The non-transitory processor-readable storage medium of claim 8, wherein an intensity of the non-visual indication is based at least in part on a magnitude of deviation of the intended target from a center of the display.

12. The non-transitory processor-readable storage medium of claim 8, wherein the non-visual indication comprises speech.

13. The non-transitory processor-readable storage medium of claim 12, wherein the speech indicates a proposed corrective direction for the mobile device to be moved in order to substantially center the intended target within the display.

14. The non-transitory processor readable storage medium of claim 8, wherein determining the intended target includes activating a fixation mode associated with the mobile device.

15. A computing system comprising
   one or more processors associated with a mobile device;
   a camera associated with the mobile device; and
   a computer-readable storage medium storing instructions that, when executed by the one or more processors, cause the one or more processors to:
      identify an intended target, wherein the intended target is substantially centered within a display associated with the camera;
      determine that the intended target is not currently centered within the display based at least in part on a predetermined positional threshold, the determining being performed responsive to one or more of a first change in orientation of the computing device and a change in location of the intended target; and
      output a non-visual indication that the intended target has exceeded the predetermined positional threshold associated with the display, wherein the non-visual indication indicates, at least in part, that a second change in orientation of the computing device is necessary to substantially center the intended target within the display.

16. The computing system of claim 15, wherein the instructions further cause the one or more processors to:
   calculate a distance between an original position associated with the intended target and a new position associated with the intended target.

17. The computing system of claim 16, wherein the instructions further cause the one or more processors to:
   compare the distance to the predetermined positional threshold.

18. The computing system of claim 15, wherein an intensity of the non-visual indication is based at least in part on a magnitude of deviation of the intended target from a center of the display.

19. The computing system of claim 15, wherein the non-visual indication is at least one of an audible indication and a vibration.

20. The computing system of claim 15, wherein the non-visual indication comprises speech.

* * * * *